US012749724B2

(12) United States Patent
Kim et al.

(10) Patent No.: US 12,749,724 B2
(45) Date of Patent: Sep. 29, 2026

(54) DIAGNOSTIC APPARATUS FOR DRY ELECTRODE MIXTURES

(71) Applicants: HYUNDAI MOTOR COMPANY, Seoul (KR); KIA CORPORATION, Seoul (KR)

(72) Inventors: Hyun Jin Kim, Daegu (KR); Han Nah Song, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 162 days.

(21) Appl. No.: 18/531,090

(22) Filed: Dec. 6, 2023

(65) Prior Publication Data

US 2025/0046888 A1 Feb. 6, 2025

(30) Foreign Application Priority Data

Jul. 31, 2023 (KR) ........................ 10-2023-0099369

(51) Int. Cl.

*G01N 11/14* (2006.01)
*H01M 4/04* (2006.01)
*H01M 10/42* (2006.01)

(52) U.S. Cl.

CPC ...... *H01M 10/4285* (2013.01); *G01N 11/142* (2013.01); *H01M 4/04* (2013.01)

(58) Field of Classification Search

CPC ... H01M 10/4285; H01M 4/04; G01N 11/142
USPC .............................. 324/500, 600, 76.11, 693
See application file for complete search history.

(56) References Cited

U.S. PATENT DOCUMENTS

| | | | | |
|---|---|---|---|---|
| 5,800,706 | A | 9/1998 | Fischer | |
| 11,545,666 | B2 | 1/2023 | Wang et al. | |
| 11,777,070 | B2 | 10/2023 | Yudi et al. | |
| 11,811,066 | B2 | 11/2023 | Wang et al. | |
| 2013/0157141 | A1* | 6/2013 | Zhong | H01M 4/622 252/502 |
| 2014/0109386 | A1* | 4/2014 | Matthews | B23P 13/00 29/592 |

(Continued)

FOREIGN PATENT DOCUMENTS

| | | | |
|---|---|---|---|
| CN | 101398400 | A | 4/2009 |
| CN | 214668744 | U | 11/2021 |

(Continued)

OTHER PUBLICATIONS

Analytical Equipment for Lithium-Ion Batteries, Micromeritics Instrument Comporation, 2022, 16pp.

*Primary Examiner* — Huy Q Phan
*Assistant Examiner* — Trung Q Nguyen
(74) *Attorney, Agent, or Firm* — Lempia Summerfield Katz LLC

(57) ABSTRACT

A diagnostic apparatus for dry electrode mixtures includes a frame, and a measurer provided in the frame and configured to measure an electrical conductivity and a flow property of a dry electrode mixture prepared. The dry electrode mixture comprises a powder mixture including an electrode active material, a conductive material, and a binder. The diagnostic apparatus further includes a controller configured to evaluate characteristics of the dry electrode mixture based on the electrical conductivity and the flow property measured by the measurer.

14 Claims, 6 Drawing Sheets

(56) References Cited

U.S. PATENT DOCUMENTS

| | | | | |
|---|---|---|---|---|
| 2014/0346046 | A1* | 11/2014 | Andelman | H01G 11/56<br>204/674 |
| 2017/0207489 | A1* | 7/2017 | Zhamu | H01M 4/13 |
| 2019/0305316 | A1 | 10/2019 | Wang et al. | |
| 2021/0098770 | A1 | 4/2021 | Yudi et al. | |
| 2021/0344056 | A1 | 11/2021 | Kim et al. | |
| 2022/0238865 | A1* | 7/2022 | Takahashi | H01M 4/505 |
| 2022/0255152 | A1 | 8/2022 | Choi et al. | |
| 2023/0075404 | A1 | 3/2023 | Wang et al. | |
| 2024/0282905 | A1* | 8/2024 | Kim | H01M 4/0416 |
| 2024/0322118 | A1* | 9/2024 | Pyun | H01M 4/13 |
| 2024/0339586 | A1* | 10/2024 | Bogenstahl | B22F 7/08 |
| 2024/0372139 | A1* | 11/2024 | Molinski | H01M 10/0525 |
| 2025/0001650 | A1* | 1/2025 | Hackfort | G01N 9/02 |

FOREIGN PATENT DOCUMENTS

| | | | |
|---|---|---|---|
| EP | 3855551 | A1 | 7/2021 |
| JP | 7220832 | B2 | 2/2023 |
| KR | 101732773 | B1 | 5/2017 |
| KR | 20200138263 | A | 12/2020 |
| KR | 102238248 | B1 | 4/2021 |
| KR | 20220039040 | A | 3/2022 |
| WO | 2019191397 | A1 | 10/2019 |
| WO | 2019222110 | A1 | 11/2019 |

* cited by examiner

DIAGNOSTIC APPARATUS FOR DRY ELECTRODE MIXTURES

CROSS-REFERENCE TO RELATED APPLICATION

This application claims the benefit of and priority to Korean Patent Application No. 10-2023-0099369, filed on Jul. 31, 2023, the entire contents of which are incorporated herein by reference.

TECHNICAL FIELD

The present disclosure relates to a dry electrode mixture for batteries. More particularly, the present disclosure relates to an apparatus for diagnosing the state of a dry electrode mixture.

BACKGROUND

Recently, the application of rechargeable secondary batteries is expanding to various fields from small electronic devices to large energy storage systems. Particularly, research and development of secondary batteries due to the rapid growth of the electric vehicle market are being actively conducted.

Electrodes for secondary batteries are generally manufactured by a wet process. In the wet process, a slurry is manufactured by dissolving an electrode active material, a binder, and a conductive material, which are included in an electrode, in a solvent. However, a dry process which may increase the energy density of an electrode compared to the wet process without using the solvent required in the wet process has recently been introduced.

In the dry process of an electrode, a mixture is prepared by mixing electrode materials, and a dry electrode film is formed by performing a film forming process through pressing or calendaring. Then manufacture of the electrode is completed by bonding the formed dry electrode film to a current collector.

Manufacturing of electrodes by the drying process is in an early or an initial stage of technical development, and thus, there are no technologies relating to quality evaluation. Therefore, when a defect is found in the final stage of the manufacturing process of electrodes, the manufacturing process should return to the first stage so as to solve the occurrence of the defect. Further, a lot of time and cost is taken to determine the cause of the defect. Therefore, in order to secure the quality of the manufactured electrode, an evaluation technology for evaluating the quality of a mixture before the film forming process is required in terms of time and cost.

The above information disclosed in this Background section is only to enhance understanding of the background of the present disclosure. Therefore, the Background section may contain information that does not form the prior art that is already known to a person having ordinary skill in the art.

SUMMARY

The present disclosure provides a diagnostic apparatus for dry electrode mixtures, which may effectively evaluate a dry electrode mixture.

In one aspect of the present disclosure, a diagnostic apparatus for dry electrode mixtures includes: a frame, and a measurer provided in the frame and configured to measure the electrical conductivity and flow property of a dry electrode mixture prepared as a powder mixture. The powder mixture includes an electrode active material, a conductive material, and a binder. The diagnostic apparatus also includes a controller configured to evaluate the characteristics of the dry electrode mixture based on the electrical conductivity and the flow property measured by the measurer.

Other aspects and embodiments of the disclosure are discussed below.

The above and other features of the disclosure are discussed below.

BRIEF DESCRIPTION OF THE DRAWINGS

The above and other features of the present disclosure should now be described in detail with reference to certain embodiments thereof illustrated in the accompanying drawings which are given hereinbelow by way of illustration only, and thus are not limitative of the present disclosure, and wherein.

Figure 1:
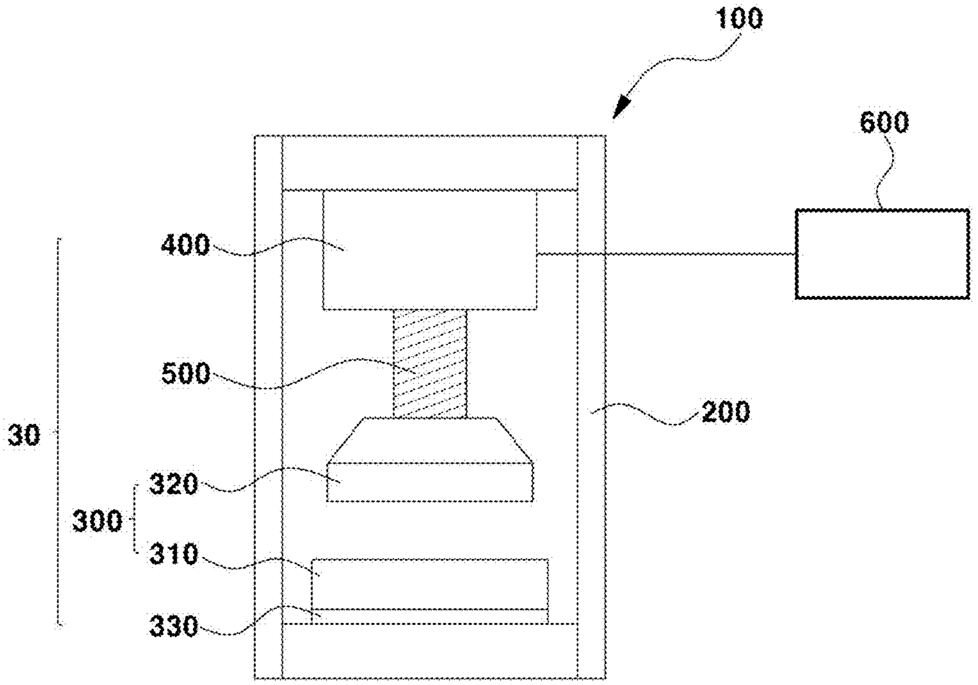
FIG. 1 is a view showing a diagnostic apparatus for dry electrode mixtures according to one embodiment of the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, should be determined in part by the particular intended application and use environment.

In the figures, reference numbers refer to the same or equivalent parts of the present disclosure throughout the several figures of the drawing.

DETAILED DESCRIPTION

Specific structural or functional descriptions in embodiments of the present disclosure set forth in the description which follows should be given to describe the embodiments of the present disclosure. Additionally, the present disclosure may be embodied in many alternative forms. Further, it should be understood that the present disclosure should not be construed as being limited to the embodiments set forth herein, and the embodiments of the present disclosure are provided only to completely disclose the disclosure and cover modifications, equivalents, or alternatives that come within the scope and technical range of the disclosure.

In the following description of the embodiments, terms, such as "first" and "second," are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

Wherever possible, the same reference numbers are used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, elements, components, and/or combinations thereof, but do not preclude the presence or addition of one or more other features, integers, operations, elements, components, and/or combinations thereof.

When a component, device, element, or the like of the present disclosure is described as having a purpose or performing an operation, function, or the like, the component, device, or element should be considered herein as being "configured to" meet that purpose or perform that operation or function.

Hereinafter reference is made in detail to various embodiments of the present disclosure, examples of which are illustrated in the accompanying drawings and described below.

A dry electrode may be manufactured from a dry electrode mixture and a current collector. The dry electrode mixture may be put into a film forming apparatus, which includes film forming equipment. The dry electrode mixture may be formed into a dry electrode film through a film forming process, and the dry electrode may be manufactured by bonding or laminating the dry electrode film to or on the current collector. Formation of the dry electrode film and laminating of the dry electrode film on the current collector may be performed in one device or may be performed in separate devices.

The dry electrode mixture is a mixture of an electrode active material, a conductive material, and a binder. The dry electrode mixture is prepared by mixing the electrode active material, the conductive material, and the binder with a mixer. As a non-limiting example, the dry electrode mixture may be manufactured by a high-shear mixer using rotation or a pneumatic mixer using air. Dispersion conditions may be changed by a dispersion speed (i.e., a rotational speed) and a dispersion time (i.e., an operating time) of such a mixer.

According to the present disclosure, the dry electrode may be a cathode or an anode.

In some examples of implementation, when a cathode is manufactured, the electrode active material includes a cathode active material. As a non-limiting example, the cathode active material may include nickel manganese cobalt oxide (NMC), lithium ferrophosphate (LFP), lithium cobalt oxide (LCO), or sulfur. For example, the cathode active material may be a layered compound, such as lithium cobalt oxide ($LiCoO_2$) or lithium nickel oxide ($LiNiO_2$) or a compound in which a part of the layered compound is substituted with one or more transition metals, a lithium manganese compound represented by a chemical formula of $Li_{1+x}Mn_{2-x}O_4$ (x=0 to 0.33) such as $LiMnO_3$, $LiMn_2O_3$, or $LiMnO_2$, a lithium copper oxide, such as $Li_2CuO_2$, a vanadium oxide, such as $LiV_3O_8$, $LiFe_3O_4$, $V_2O_5$, or $Cu_2V_2O_7$, a Ni site-type lithium nickel oxide represented by a chemical formula of $LiNi_{1-x}M_xO_2$ (M=Co, Mn, Al, Cu, Fe, Mg, B or Ga, and x=0.01 to 0.3), a lithium manganese composite oxide represented by a chemical formula of $LiMn_{2-x}M_xO_2$ (M=Co, Ni, Fe, Cr, Zn or Ta, and x=0.01 to 0.1) or a chemical formula of $Li_2Mn_3MO_8$ (M=Fe, Co, Ni, Cu or Zn), $LiMn_2O_4$ in which a part of Li is substituted with an alkali earth metal ion, a lithium metal phosphate represented by a chemical formula of $LiMPO_4$ (M=Fe, Co, Ni or Mn), a disulfide compound, or $Fe_2(MoO_4)_3$, without being limited thereto.

In some examples of implementation, when an anode is manufactured, the electrode active material includes an anode active material. As a non-limiting example, the anode active material may include graphite or silicon. For example, the anode active material may be carbon, such as hard carbon or graphitic carbon, a metal composite oxide such as $LixFe_2O_3$ ($0 \le x \le 1$), $Li_xWO_2$ ($0 \le x \le 1$), or $Sn_xMe_{1-x}Me'_yO_z$ (Me=Mn, Fe, Pb or Ge, Me'=Al, B, P, Si, an element of Group I, II or III in the periodic table, or a halogen element, $0<x\le 1$, $1\le y\le 3$, and $1\le z\le 8$), lithium metal, a lithium alloy, a silicon-based alloy, a tin-based alloy, a silicon-based oxide, such as SiO, SiO/C or $SiO_2$, a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_{204}$ or $BizO_5$, a conductive polymer, such as polyacetylene, or a Li—Co—Ni-based material.

The conductive material may include a carbonaceous material. For example, the conductive material may include one of various carbonaceous materials, such as super P, Ketjen black, single-walled carbon nanotubes (SWCNTs), or multi-walled carbon nanotubes (MWCNTs). Further, a dry electrode mixture prepared to manufacture a dry electrode for all-solid-state batteries may further include a polyethylene oxide (PEO)-based polymer, an oxide-based solid electrolyte, and/or a sulfide-based solid electrolyte.

The binder may include a material having C—F bonds, i.e., including carbon and fluorine, such as polytetrafluoroethylene (PTFE) or polyvinylidene fluoride (PVDF). The binder may also include styrene butadiene rubber (SBR)/carboxy methyl cellulose (CMC) or polyacrylonitrile (PAN).

Inventors of the present invention have filed a patent application entitled "Method of evaluating dry electrode mixture by measuring a flow property thereof" (Korean Patent Application No. 10-2023-0021097, Application Date: Feb. 17, 2023) and a patent application entitled "Method of evaluating dry electrode mixture by measuring electrical conductivity thereof" (Korean Patent Application. 10-2023-0055862, Application Date: Apr. 28, 2023).

In the former, a flow property of a manufactured dry electrode mixture is measured. Flow property measurements may be executed based on ASTM D6128 which is a standard of the American Society for Testing and Materials (ASTM). In such an evaluation method, shear stress is applied to a designated amount of the dry electrode mixture, and internal stress of the dry electrode mixture in an equilibrium state or in a steady state flow is measured. The internal stress of the dry electrode mixture in the equilibrium state indicates force distribution, which is varied depending on frictional force and cohesive force between particles of the mixture, and the flow index of the mixture may be quantified based on such measurement.

In more detail, a shear stress is applied to the dry electrode mixture by operating a blade while applying pressure to the dry electrode mixture from above, based on ASTM D6128. The blade comes into contact with the powder of the dry electrode mixture and applies minute shear stress to the dry electrode mixture by applying minute pressure to the powder of the dry electrode mixture from the moment when the blade comes into contact with the powder of the dry electrode mixture. A collapse among powder particles occurs in the dry electrode mixture at a designated point in time depending on the properties of the powder, and the stress of the powder at this point in time is measured as internal stress data. When the collapse occurs, measurement is performed again by applying the shear stress to the powder of the dry electrode mixture by applying higher pressure thereto. The flow index of the powder is acquired by differentiating the measured internal stress data with respect to the applied shear stress.

The flow index acquired by the flow property evaluation method is varied depending on the ratio of electrode materials, i.e., the electrode active material, the conductive material, and the binder, in the mixture. Further, the flow index is varied depending on a degree of mixing of the electrode materials or mixing or dispersion conditions even in the mixture having the same ratio of the electrode materials. When the binder or the conductive material is not uniformly dispersed and is thus concentrated upon a specific space, shear stress for mixing is lacking or excessive, and thus, the degree of compounding of the mixture may be varied. Therefore, when the degrees of dispersion and compounding of the mixture to form a dry electrode film are acquired, a flow property difference with a mixture having a different degree of mixing may be determined.

Therefore, the quality or nature of a finished mixture may be predicted through the flow property evaluation method. The nature of a mixture of electrode materials may indicate a film formation probability through the film forming process.

Next, it is determined whether or not the acquired flow index of the corresponding mixture is in a predetermined flow index range. According to the present disclosure, a predetermined flow index becomes a reference in mixture flow property evaluation. Concretely, when a target mixture to be evaluated has the predetermined flow index, it may be predicted that the mixture is formed into a normal film through the film forming process. Further, the predetermined flow index range is set in consideration of an error. Additionally, when a target mixture to be evaluated has a flow index within the predetermined flow index range, it is predicted that the mixture is formed into a normal film through the film forming process. The predetermined flow index may be acquired by measuring flow indexes of respective dry electrode mixtures having different ratios of electrode materials and mixing conditions, and testing whether or not the respective dry electrode mixtures are formed into a film. It is determined that the predetermined flow index range is 0.50 to 0.70 in case of a cathode and is 0.60 to 0.80 in case of an anode.

In the latter (Korean Patent Application. 10-2023-0055862, Application Date: Apr. 28, 2023), the electrical conductivity of a dry electrode mixture may be measured. Furthermore, a ratio of materials forming the dry electrode mixture, a degree of dispersion of the materials, and a degree of fibrillization of a binder may be evaluated based on the measured electrical conductivity.

Fibrillization of the binder may indicate that spherical particles of the binder are changed to fibril structures by applying energy to the dry electrode mixture during the mixing process of the dry electrode mixture. Concretely, the binder includes primary particles and secondary particles. Small binder particles having a size of about 500 nanometer (nm) or less may be referred to as the primary particles, and particles having a size of about hundreds of nanometers and formed by aggregation of the primary particles may be referred to as the secondary particles. While applying an energy to the dry electrode mixture during the mixing process of the dry electrode mixture, the secondary particles are separated into the primary particles, and the primary particles are changed from spherical structures to fine fibers or fibril structures by high shearing. This phenomenon is referred to as fibrillization of the binder.

Due to such a fibrillization process of the binder, the fibril structures may have a long length or a short length or may be thick or thin. Such a degree of the fibril structures may be referred to as a degree of fibrillization of the binder. A proper degree of fibrillization of the binder is required, as described above.

The degree of fibrillization of the binder may depend on dispersion conditions, such as a dispersion speed or a dispersion time, of a specific dry electrode mixture. For example, the degree of fibrillization of the binder generally increases as the dispersion speed or the dispersion time of a given dry electrode mixture is increased. Further, as fibrillization of the binder progresses, the electrical conductivity of the dry electrode mixture increases and eventually converges to a certain level and then decreases. As fibrillization of the binder progresses, fibril structures are spread thinly and thus electron transfer paths are secured, which causes resistance between particles of the dry electrode mixture to be reduced and electrical conductivity of the dry electrode mixture to be increased. However, as fibrillization of the binder excessively progresses, the fibril structures are coated on electrode particles and thus resistance is increased, and the electrical conductivity of the dry electrode mixture is decreased. Further, the film forming process in which the dry electrode mixture is formed into a thin film should be performed so as to bond the fibrillized dry electrode mixture to a base material. In this regard, the fibrillized dry electrode mixture having fibril structures of a specific thickness or more is advantageous in film formation. In other words, excessive fibrillization is disadvantageous in film formation. Considering these characteristics, a dispersion speed and a dispersion time for appropriate fibrillization of each dry electrode mixture may be defined.

As described above, the dry electrode mixture includes components including the electrode active material, the conductive material, and the binder. Each component has different intrinsic electrical conductivities. Further, since the size of agglomerations of particles of the binder, the degree of dispersion of the binder, and the like, are varied depending on the degree of fibrillization of the binder, the electrical conductivity of the dry electrode mixture is varied depending on the shape or density of the binder. The present disclosure is configured to evaluate the dry electrode mixture using these characteristics of the dry electrode mixture.

The electrical conductivity of the dry electrode mixture is measured while applying predetermined or variable pressure to the dry electrode mixture. The dry electrode mixture is fixed to have a volume of an area of S and a height of H or to have a mass of w (S, h, and w being predetermined values). The electrical conductivity of the dry electrode mixture is measured by a probe while applying designated pressure to the dry electrode mixture from the top thereof having the above-described specific amount. The electrical conductivity (Siemens/cm) depending on pressure (kilopascal (kPa) or megapascal (MPa)) is measured, and measured data may be used to evaluate the dry electrode mixture, for example, to determine whether or not fibrillization of the binder is appropriate.

Whether or not the fibrillization of the binder in the dry electrode mixture to be measured is appropriate, may be determined by comparing the measured electrical conductivity with pre-collected information. The pre-collected information includes ratios of components in various dry electrode mixtures, dispersion speeds, dispersion times, electrical conductivities of the dry electrode mixtures, and whether or not fibrillization of the binder in each of the dry electrode mixtures is appropriate. Therefore, the ratio of the components of the dry electrode mixture to be measured may be estimated by comparing the measured electrical conductivity with the pre-collected information. Also, whether or not the fibrillization of the binder in the dry electrode mixture is appropriate may be determined based on the estimated ratio of the components in the dry electrode mixture.

The present disclosure provides a diagnostic apparatus for dry electrode mixtures which may perform both evaluation of flow property and measurement of electrical conductivity of a dry electrode mixture useful in evaluating the dry electrode mixture at the same time. According to the present disclosure, separate apparatuses configured to measure the two characteristics individually are not required. As a result, the time and cost required for measurements may be reduced, and the analysis efficiency may be improved.

A diagnostic apparatus 100 for dry electrode mixtures may perform the evaluation of flow property and the measurement of electrical conductivity of a dry electrode mixture at the same time.

As shown in FIG. 1, according to one embodiment of the present disclosure, the diagnostic apparatus 100 may include a frame 200 and a measurer 30. The measurer 30 includes a receiving portion 300, a driver 400, and a moving portion 500. The measurer 30 is configured to measure the flow property and the electrical conductivity of the dry electrode mixture provided in the frame 200. The receiving portion 300 may receive the dry electrode mixture which is a target object to be measured. The driver 400 and the moving portion 500 may have a structure configured to move the receiving portion 300 and may provide driving force so as to measure the flow property and electrical conductivity of the dry electrode mixture received in the receiving portion 300 and to evaluate the dry electrode mixture.

Figure 2:
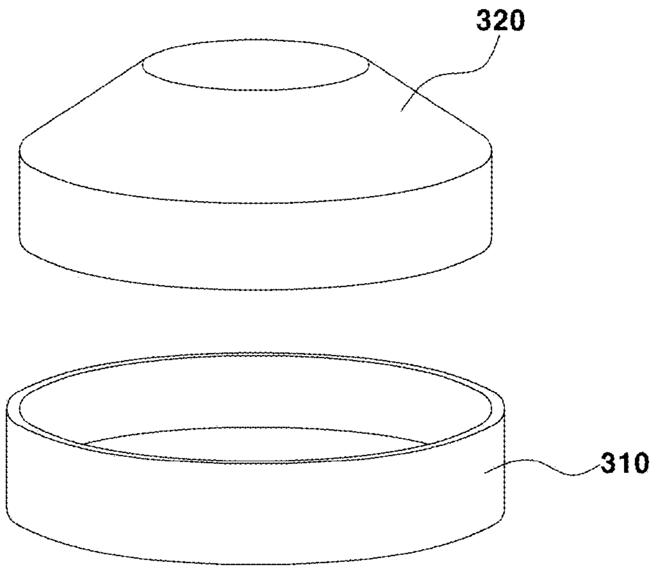
FIG. 2 is a view showing a holder and a housing of a diagnostic apparatus according to one embodiment of the present disclosure.

Referring to FIG. 2, the receiving portion 300 includes a holder 310 and a housing 320. The holder 310 is configured to receive the dry electrode mixture to be evaluated. The housing 320 is configured to cover the holder 310 so that a series of operations for measurement is performed in the housing 320.

Figure 3:
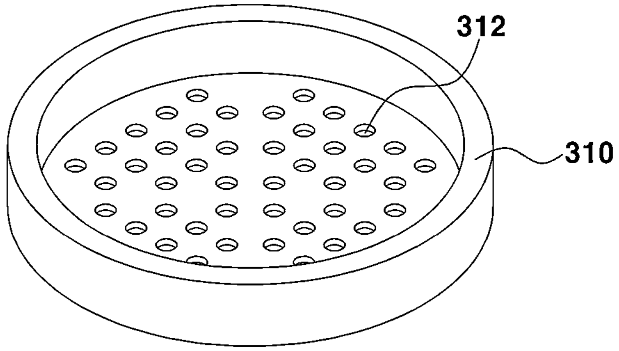
FIG. 3 is a view showing a holder of a diagnostic apparatus according to one embodiment of the present disclosure.

As shown in FIG. 3, the holder 310 may include a plurality of recesses 312 indented from the inner surface of the holder 310. The recesses 312 may be formed in a designated pattern on the inner bottom surface of the holder 310. The illustrated pattern is only one example, and the recesses 312 may be formed in other patterns. The recesses 312 function to prevent the dry electrode mixture from easily sliding due to rotation of a blade 322, when the flow property of the dry electrode mixture is measured by the diagnostic apparatus 100.

Figure 4:
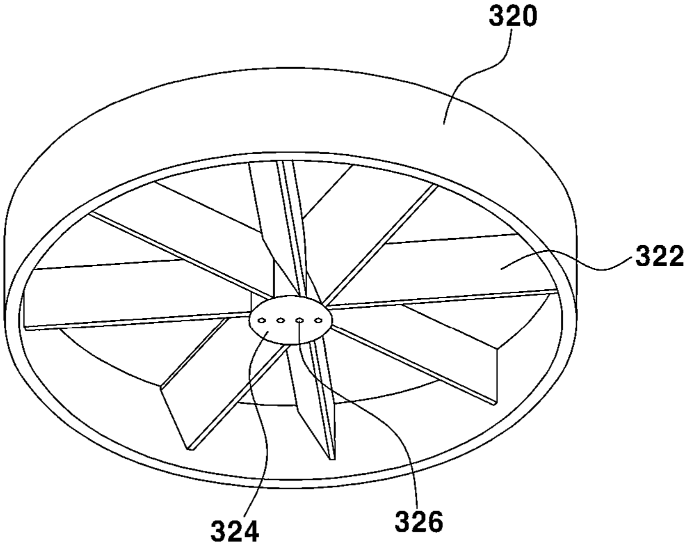
FIG. 4 is a view showing a housing of a diagnostic apparatus according to one embodiment of the present disclosure.
Figure 5:
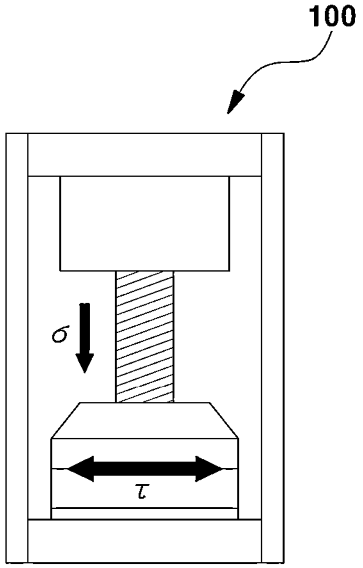
FIG. 5 is a view showing a diagnostic apparatus according to one embodiment of the present disclosure.

Referring to FIGS. 4 and 5, elements configured to execute evaluation are provided in the housing 320. A rotatable blade 322 is provided in the housing 320. A rotation force may be applied to the dry electrode mixture in the holder 310 by rotation of the blade 322.

The housing 320 includes a probe 326 provided on a shaft 324 that is a center portion of the blade 322. The probe 326 may come into contact with the dry electrode mixture disposed in the holder 310 and may measure the electrical conductivity of the dry electrode mixture. As one non-limiting example, the probe 326 may be a four-point probe. Particularly, the electrical conductivity of the dry electrode mixture may be measured in the state in which a normal stress $\sigma$ is applied to the dry electrode mixture by descent of the moving portion 500. A shear stress $\tau$ and the normal stress $\sigma$ may be changed by the rotational speed of the blade 322 and movement of the moving portion 500 or pressing force by the moving portion 500 depending on desired settings.

Figure 6:
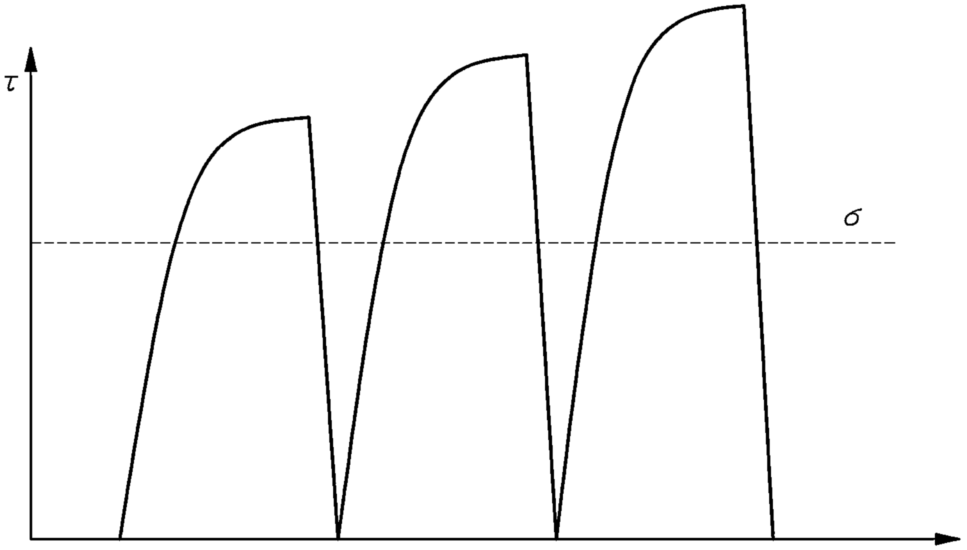
FIG. 6 is a graph representing shear stress measured under a certain normal stress in a diagnostic apparatus according to one embodiment of the present disclosure.

Referring to FIG. 6, as the moving portion 500 and the housing 320 mounted under the moving portion 500 are lowered, the flow property and electrical conductivity of the dry electrode mixture are measured. The normal stress $\sigma$ is applied to the dry electrode mixture by lowering the moving portion 500 toward the dry electrode mixture, and the shear stress $\tau$ is applied to the dry electrode by rotating the blade 322 so as to measure the flow property of the dry electrode mixture. The flow property of the dry electrode mixture is measured by applying the shear stress $\tau$ several times under the same normal stress $\sigma$ and, at this time, not only the flow property of the dry electrode mixture but also the electrical conductivity of the dry electrode mixture may be measured by the probe 326 under the illustrated normal stress $\sigma$. In one example, the electrical conductivity of the dry electrode mixture may be measured in the state in which only normal stress $\sigma$ is applied to the dry electrode mixture, i.e., before the shear stress $\tau$ is applied to the dry electrode mixture.

In some examples of implementation, a part of the housing 320 in which the blade 322 is installed may be separated from the remainder of the housing 320. In this case, the corresponding part of the housing 320 may be easily cleaned.

Figure 7:
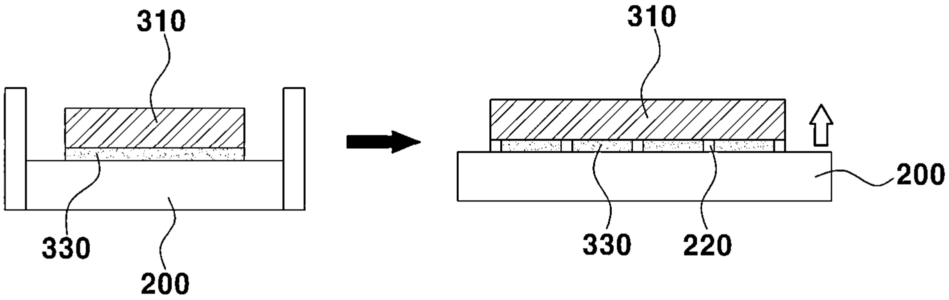
FIG. 7 is a view showing support protrusions of a diagnostic apparatus according to one embodiment of the present disclosure.

The diagnostic apparatus 100 may further include a scale 330. The scale 330 is disposed at the bottom of the frame 200. The scale 330 may measure the mass of the dry electrode mixture in the holder 310 only when the holder 310 is disposed on the upper end of the scale 330. The mass of the dry electrode mixture may be measured before the diagnostic apparatus 100 starts to perform evaluation testing and may not be measured thereafter. For this purpose, support protrusions 220, formed to protrude, may be provided on the bottom of the frame 200. The length of the scale 330 may be smaller than the length of the bottom surface of the holder 310. The support protrusions 220 may be a plurality of protrusions spaced apart from each other in a circumferential direction of the frame 200, or an annular protrusion may be continuously formed in the circumferential direction of the frame 200. As shown in FIG. 7, after the mass of the dry electrode mixture is initially measured, the support protrusions 220 may protrude from the frame 200 to space the scale 330 and the holder 310 apart from each other. The flow property and electrical conductivity of the dry electrode mixture may be measured in the state in which the holder 310 is supported by the support protrusions 220. In some examples of implementation, the support protrusions 220 may be configured to be fixed to support the holder 310, and the scale 330 may be configured to be raised to measure the mass of the dry electrode mixture and to be lowered after mass measurement.

The driver 400 may provide a driving force to the receiving portion 300. For example, the driver 400 may raise or lower the moving portion 500, and may thus raise or lower the housing 320 connected to the moving portion 500. Further, the driver 400 may rotate the moving portion 500 and may thus rotate the housing 320 and the blade 322 disposed therein. For this purpose, the driver 400 may include, for example, a cylinder and a motor.

The moving portion 500 may be raised or lowered and may be rotated by the driver 400. A pressure applied to the dry electrode mixture in the holder 310 may be adjusted by raising and lowering the moving portion 500. Further, a shear stress applied to the dry electrode mixture in the holder 310 may be changed while changing the pressure and the number of rotations (e.g., rotations per minute) of the moving portion 500.

The driver 400 may measure the internal stress of the dry electrode mixture. As described above, the flow property of the dry electrode mixture is calculated based on the shear stress, i.e., internal stress of the dry electrode mixture, when the dry electrode mixture collapses while applying the shear stress to the dry electrode mixture in the pressed state. Since the normal stress $\sigma$ and the shear stress $\tau$ are applied to the dry electrode mixture via the moving portion 500 by the driver 400, the shear stress $\tau$ applied to the dry electrode mixture by the driver 400 at a point in time when the dry electrode mixture collapses may be collected as the internal stress. In other words, the collected internal stress may be considered as the resistance of the dry electrode mixture based on the driving of the driver 400.

Figure 8:
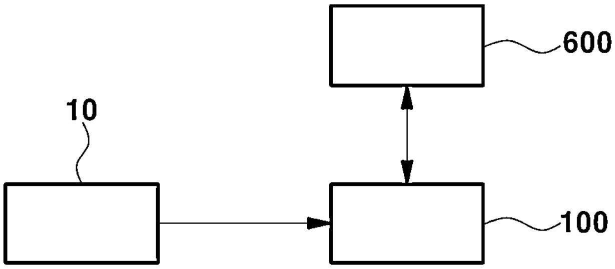
FIG. 8 is a block diagram showing some elements of a diagnostic apparatus according to one embodiment of the present disclosure.

Referring to FIG. 8, a controller 600 is configured to control the operation of the diagnostic apparatus 100. For example, the controller 600 may control the operation of the driver 400. Further, the controller 600 may receive a value measured by the probe 326 and may receive internal stress data.

Concretely, the controller 600 may collect data about the force (kilonewton, kN) applied by the diagnostic apparatus 100, the electrical conductivity (S/cm), the applied shear stress (kPa), the internal stress (kPa) to the applied shear stress, and the density (kilogram per cubic meter, $kg/m^3$).

More concretely, the diagnostic apparatus 100 may measure data, and the measured data may be transmitted to the controller 600. As one example, the data of the diagnostic apparatus 100 includes a density ($kg/m^3$) to the normal stress $\sigma$ (kPa) exerted by the driver 400. A mass value measured by the scale 330 may be used as the mass (kg). As another example, the data of the diagnostic apparatus 100 includes measured values related to electrical conductivity. The measured values related to electrical conductivity may include at least one of resistance (ohm, Ω) to normal stress $\sigma$ (kPa), volume resistivity (ohm-centimeter, Ω·cm) to normal stress $\sigma$ (kP), or conductivity (S/cm) to normal stress $\sigma$ (kPa). As yet another example, the data of the diagnostic apparatus 100 includes measured values related to flow property. The measured values related to flow property may include at least one of apparent density ($kg/m^3$) to the applied shear stress $\tau$, the effective angle of internal friction (°) with respect to the applied shear stress $\tau$, or internal stress (Pa) to the applied shear stress $\tau$. The effective angle may be calculated as a ratio of the shear stress $\tau$ to the normal stress $\sigma$ applied to the dry electrode mixture. The effective angle of internal friction is the same as the maximum value just before the dry electrode mixture collapses. The controller 600 may calculate the flow index by differentiating the internal stress with respect to the applied shear stress $\tau$.

The controller 600 includes a processor and a memory. The memory stores commands that may be executed by the processor, predetermined flow indexes, pre-collected information related to electrical conductivity, and the like. The commands may include commands configured to execute the operation of the processor and/or the operation of respective elements of the processor. The memory may be a volatile or non-volatile memory, and the processor may execute the commands stored in the memory. The processor may also execute computer-readable codes and commands, which are stored in the memory.

Figure 9:
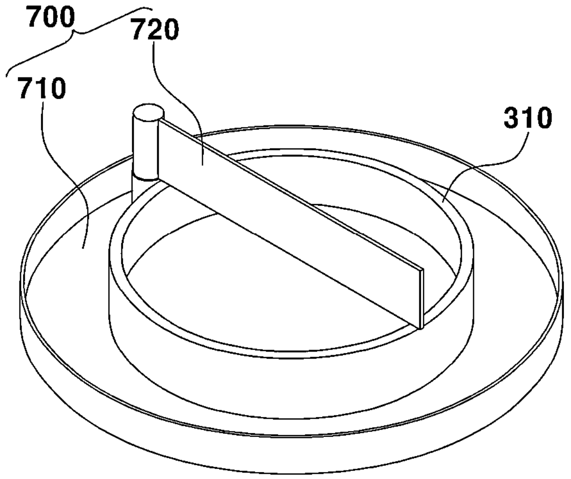
FIG. 9 is a view showing a flattener of a diagnostic apparatus according to one embodiment of the present disclosure.
Figure 10:
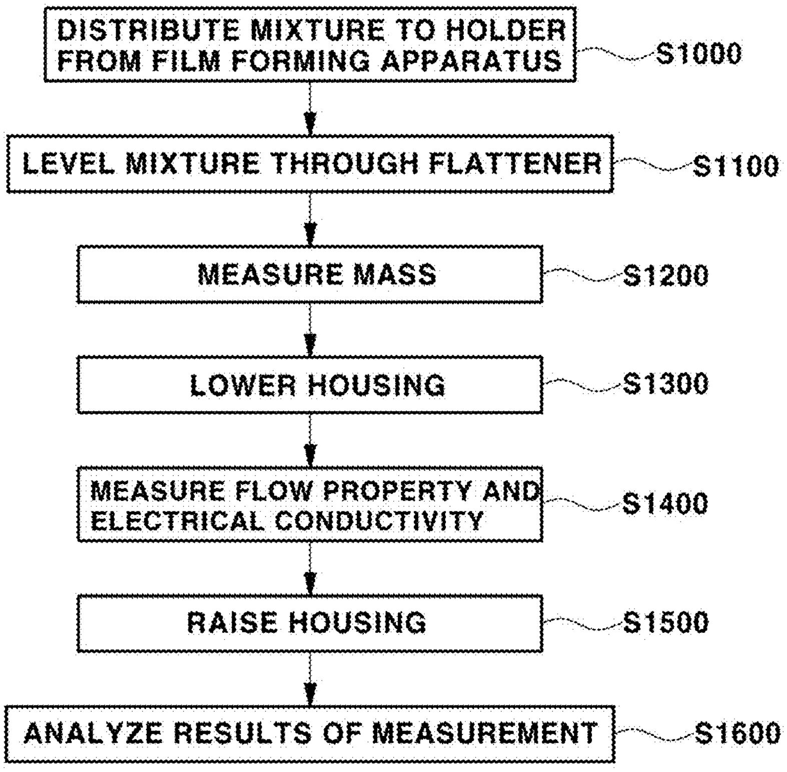
FIG. 10 is a flowchart representing an operation of a diagnostic apparatus according to one embodiment of the present disclosure.

Referring to FIGS. 9 and 10, the operation of the diagnostic apparatus 100 according to the present disclosure is described below.

First, a film forming apparatus 10 dispenses a dry electrode mixture to be evaluated to the holder 310 (S1000). The dry electrode mixture dispensed to the holder 310 is leveled by a flattener 700, as shown in FIG. 9. The flattener 700 may include a tray 710 and a cutter 720. The cutter 720 is mounted on the tray 710 and is configured to be rotatable with respect to the tray 710. The dry electrode mixture may be leveled through the swiping motion of the cutter 720.

The holder 310 is disposed on the scale 330 in the diagnostic apparatus 100, and the mass of the dry electrode mixture received in the holder 310 is measured (S1200). The support protrusions 220 may protrude to support the holder 310 after mass measurement, and then, measurement of the mass of the dry electrode mixture may be stopped. Otherwise, the support protrusions 220 may be configured to be fixed, and the scale 330 may be raised to measure the mass of the dry electrode mixture and may then be lowered after mass measurement.

The controller 600 operates the driver 400 and the moving portion 500 to perform the evaluation of the dry electrode mixture (S1300 and S1400). The housing 320 has a diameter smaller than the holder 310, so the blade 322 and the shaft 324 may come into contact with the dry electrode mixture in the holder 310 without interference with the holder 310. The moving portion 500 is lowered by the operation of the driver 400 and thus applies pressure to the dry electrode mixture. Electrical conductivity of the dry electrode mixture is measured by the probe 326. Further, the blade 322 is rotated and thus applies a shear stress to the dry electrode mixture, and the flow property of the dry electrode mixture (i.e., the internal stress of the dry electrode mixture at a point in time when the mixture collapses due to the applied shear stress) is measured. After the flow property measurement has been completed, rotation of the blade 322 may be stopped, and the electrical conductivity of the dry electrode mixture may be measured once again by the probe 326. When such a first measurement cycle has been completed, the flow property of the dry electrode mixture is measured again. In other words, a greater normal stress than in the first measurement cycle is applied to the dry electrode mixture, and an internal stress of the dry electrode mixture at a point in time when the dry electrode mixture collapses is measured while applying shear stress to the dry electrode mixture under the corresponding normal stress. Such a process is repeated a predetermined number of times while increasing the normal stress, and thereby, data related to flow property may be acquired. Further, in some examples of implementation, the electrical conductivity of the dry electrode mixture is measured whenever the normal stress is changed. In some examples of implementation, the electrical conductivity of the dry electrode mixture is measured before the application of the shear stress, after the application of the shear stress, or before and after the application of the shear stress, whenever the normal stress is changed. In addition, in some examples of implementation, the electrical conductivity of the dry electrode mixture may be measured in the state in which the shear stress is applied to the dry electrode mixture.

After the electrical conductivity and the flow property measurement, the housing 320 may be raised by the driver 400 (S1500), and the measured flow properties and electrical conductivities may be transmitted to the controller 600 to be analyzed (S1600). In other words, the controller 600 may calculate a flow index based on stress data when the dry electrode mixture collapses due to the applied shear stress and may determine a film formation probability of the corresponding dry electrode mixture by determining whether the calculated flow index is within the predetermined flow index range. Further, the controller 600 may predict a ratio of components of the corresponding dry electrode mixture and determine whether a binder is fibrillized by comparing the measured electrical conductivity with pre-collected information.

Both the flow property and electrical conductivity of the dry electrode mixture are measured in the state in which the pressure is applied to the dry electrode mixture from the top thereof. As a result, the measurement of the flow property and the measurement of the electrical conductivity may be performed at one time. Therefore, according to the present disclosure, a time taken to measure the flow property and electrical conductivity of the dry electrode mixture may be reduced, and a measurement procedure may be simplified.

As is apparent from the above description, the present disclosure provides a diagnostic apparatus for dry electrode mixtures, which may effectively evaluate a dry electrode mixture.

The disclosure has been described in detail with reference to the embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A diagnostic apparatus for dry electrode mixtures, comprising:

a frame;

a measurer provided in the frame and configured to measure an electrical conductivity and a flow property of a prepared dry electrode mixture, wherein the dry electrode mixture comprises a powder mixture of an electrode active material, a conductive material, and a binder; and a controller configured to evaluate characteristics of the dry electrode mixture based on the electrical conductivity and the flow property measured by the measurer, wherein the measurer comprises:

a holder configured to receive the dry electrode mixture; and a housing configured to apply a shear stress to the dry electrode mixture in the holder while applying pressure to the dry electrode mixture, wherein the housing comprises a probe configured to measure the electrical conductivity of the dry electrode mixture.

2. The diagnostic apparatus of claim 1, further comprising:

a moving portion connected to the housing and configured to move and rotate the housing with respect to the frame; and a driver configured to provide a moving force and a rotational force to the moving portion.

3. The diagnostic apparatus of claim 2, wherein the housing comprises a blade rotatably disposed in the housing.

4. The diagnostic apparatus of claim 3, wherein the probe is disposed at a shaft of the blade in the housing.

5. The diagnostic apparatus of claim 1, further comprising:

a scale provided on a bottom of the frame and configured to measure a mass of the dry electrode mixture.

6. The diagnostic apparatus of claim 5, wherein the frame comprises support protrusions configured to protrude from the frame, and wherein the support protrusions are configured to support a holder disposed on the scale at a distance apart from the scale.

7. The diagnostic apparatus of claim 1, wherein the controller is further configured to:

compare the measured flow property with a predetermined flow index; and determine that the dry electrode mixture is capable of being formed into a film, based on determining that the flow property is within a range of the predetermined flow index.

8. The diagnostic apparatus of claim 7, wherein the controller is further configured to:

determine an internal stress of the dry electrode mixture at a point in time when the dry electrode mixture collapses by increasing shear stress applied to the dry electrode mixture in a state in which a designated normal stress is applied to the dry electrode mixture; and determine the flow property by differentiating the internal stress with respect to the shear stress.

9. The diagnostic apparatus of claim 1, wherein the controller is further configured to predict a ratio of components of the dry electrode mixture by comparing the measured electrical conductivity with pre-collected data.

10. The diagnostic apparatus of claim 9, wherein the pre-collected data comprises ratios of components in each of a plurality of dry electrode mixtures, dispersion conditions when each of the dry electrode mixtures is manufactured, electrical conductivity of each of the dry electrode mixtures, and a degree of fibrillization of a binder in each of the dry electrode mixtures.

11. The diagnostic apparatus of claim 10, wherein the controller is further configured to predict the ratio of the components in the dry electrode mixture and predict a degree of fibrillization of the binder in the dry electrode mixture based on data of a dry electrode mixture having the same electrical conductivity as the measured electrical conductivity among the pre-collected data.

12. The diagnostic apparatus of claim 1, further comprising:

a flattener configured to separate from the frame and level the dry electrode mixture disposed in the holder.

13. The diagnostic apparatus of claim 12, wherein the flattener further comprises:

a tray configured to have a cross-section greater than the holder, wherein the holder is disposed on the tray; and a cutter mounted on the tray and configured to level the dry electrode mixture in the holder by rotation.

14. The diagnostic apparatus of claim 1, wherein the holder further comprises a plurality of recesses indented from an inner surface of the holder.

* * * * *